Dec. 31, 1957 J. A. DRAKE Re. 24,410
PRESSURE CONTROL DEVICE
Original Filed Oct. 11, 1948
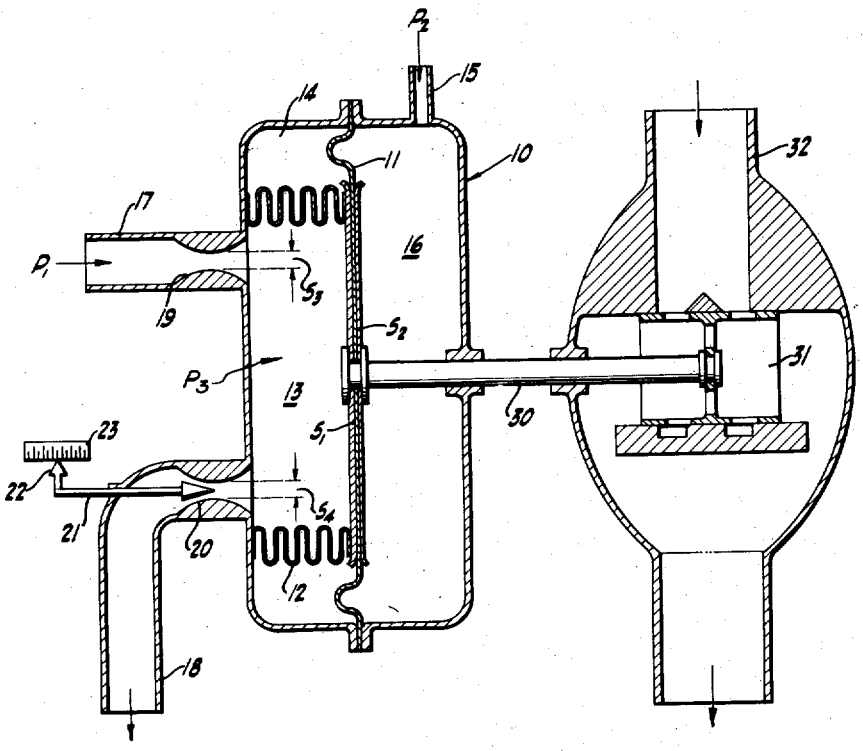
INVENTOR.
JOHN A. DRAKE
BY
Meelin and Hanscom
ATTORNEYS United States Patent Office Re. 24,410

Reissued Dec. 31, 1957

24,410

PRESSURE CONTROL DEVICE

John A. Drake, Van Nuys, Calif., assignor to Marquardt Aircraft Company, Van Nuys, Calif., a corporation of California Original No. 2,645,240, dated July 14, 1953, Serial No. 53,792, October 11, 1948. Application for reissue August 27, 1953, Serial No. 377,006

6 Claims. (Cl. 137—100)

Matter enclosed in heavy brackets [ ] appears in the original patent but forms no part of this reissue specification; matter printed in italics indicates the additions made by reissue.

This invention relates to an apparatus and a method for controlling the ratio of gas pressure. More particularly, it relates to apparatus and method for controlling the ratio of two gas pressures in a process, or in an engine such as a jet engine.

It is frequently desirable in a process, or in the operation of an engine such as a jet engine, to exercise a control over two critical pressures and to maintain these pressures in a predetermined ratio. This can be accomplished by means of a flexible diaphragm, by exposing a part of one side of the diaphragm to a vacuum and applying the pressures which it is desired to control *to* the unequal areas on opposite sides of the diaphragm. Mathematically stated, if $P_1$ and $P_2$ are the pressures which it is desired to regulate, and if the diaphragm areas to which these pressures are applied are $S_1$ and $S_2$, respectively, then the net force acting upon the diaphragm is nil if the pressures are such that the Equation 1 [or its equivalent ($1_a$)] is satisfied.

$$P_1S_1=P_2S_2 \tag{1}$$

$$\frac{P_1}{P_2}=\frac{S_2}{S_1} \tag{1a}$$

It is apparent that, by appropriately selecting the values of $S_1$ and $S_2$, and by connecting the diaphragm with a valve or other means of controlling one or the other of the pressures, it is possible to provide continuous, automatic control of the pressures, so as to maintain $P_1/P_2$ at a selected value.

Such means, however, is difficult to adjust to satisfy a different set of conditions. Thus, if it is desired to maintain the ratio $P_1/P_2$ at a different value, it is necessary to vary the value of $S_2$ or $S_1$. Mechanical means of accomplishing this are possible, but are awkward and difficult to manipulate and not too accurate in their performance.

It is an object of the present invention to provide an improved pressure control method and apparatus.

It is a further object of the invention to provide a device and a method of controlling the ratio of two gas pressures or, stated in other words, to multiply a given gas pressure, such device being readily adjustable by pnuematic means to vary the pressure ratio without resort to mechanical means for varying $S_1$ and $S_2$.

These and other objects of the invention will be apparent from the ensuing description and the appended claims.

One form which the invention may assume is exemplified in the following description and illustrated by way of example in the accompanying drawing, in which the single figure is a diagrammatic representation of the control device of the invention as applied to actuate a valve which, in turn, controls one of the pressures.

Referring now to the drawing the pressure control or pressure multiplying device comprises a gas-tight chamber 10, and disposed within such chamber is a flexible diaphragm 11 and on one side thereof is provided a bellows 12. The bellows 12 divides the space to the left of the diaphragm into a central space or chamber 13 and an annular space 14, the latter space being maintained under high vacuum. The diaphragm area exposed to the central chamber 13 is designated as $S_1$, and the opposite diaphragm area as $S_2$.

An inlet duct 15 is provided, opening into the righthand chamber 16 of the device and inlet and outlet conduits 17 and 18, respectively, are provided for the central chamber 13 in the lefthand portion of the device. The inlet duct 17 is provided with a convergent-divergent or choked section 19, having a throat *area* $S_3$ and the outlet duct is provided with a similar convergent-divergent or choked section 20, having a throat *area* $S_4$, this latter throat *area* being variable by means of a needle valve 21 having a pointer 22 and, associated therewith, a scale 23, which may be calibrated for a purpose explained hereinafter. As also illustrated, a rod or valve stem 30 is secured at one end to the diaphragm 11 and at its other end to a valve 31 disposed in a duct 32, which, for purposes of illustration, is indicated as a fuel duct.

In operation, the pressure control device functions as follows: The gases which it is desired to control are admitted to the ducts 15 and 17 and, of course, that admitted to the central chamber 13 through the duct 17 is vented through the outlet duct 18. Gas entering through the duct 15 and having a pressure $P_2$ exerts upon the righthand side of diaphragm 11 a force equal to $P_2 \times S_2$. The force exerted on the lefthand side of the diaphragm is determined not only by the gas pressure $P_1$ and the diaphragm area $S_1$, but also by the throat areas $S_3$ and $S_4$ of the choked sections 19 and 20. This force may be regarded as the product of an effective pressure $P_3$ in the chamber 13 and the area $S_1$; i. e., $P_3 \cdot S_1$.

I have discovered that a simple, linear relation exists between the effective pressure $P_3$ and the variable throat area $S_4$. Such relation exists when the inlet and outlet orifices are choked, and the entrant pressure $P_1$ is sufficiently high that sonic velocity is achieved in the throats [s] *areas* $S_3$ and $S_4$. *This condition of sonic velocity flow at the throat of an orifice is sometimes defined as a "choked" condition of the orifice.* Derivation of this linear relation follows:

The following mass flow parameter for the flow of a compressible fluid through an orifice can be derived from the basic laws of fluid mechanics:

$$\frac{m\sqrt{T_t}}{P_tS}=\sqrt{\frac{y}{R}}\,\frac{M}{\left[1+\frac{y-1}{2}M^2\right]^{\frac{y+1}{2(y-1)}}} \tag{2}$$

The terms used in this equation have the following meaning:

m=mass flow of process fluid
$T_t$=total temperature process fluid
$P_t$=total pressure of process fluid
S=throat area of the orifice
y=ratio of specific heat at constant pressure to specific heat at constant volume of the process fluid
R=gas constant
M=Mach number, i. e. ratio of velocity of the process fluid to speed of sound in the process fluid.

Provided the pressure is sufficiently high, the Mach number M at the throat of an orifice of the type illustrated in the drawing will be equal to 1. Further, the quantities y, R and $T_t$ may be regarded as constants. It thus follows from Equation 2 that the mass flow parameter can be simplified as follows:

(3) $$\frac{m}{P_4S}=C$$

where C is a constant.

In the system described in the drawing, $m_1=m_2$. Hence, from Equation 3, (4) $$P_1S_3=P_3S_4$$

Inasmuch as $S_3$ is constant and only $S_4$ is varied, this equation reduces even further to the proportionality:

(5) $$\frac{P_1}{P_3}\sim S_4$$

It is thus apparent that, with a simple device such as illustrated in the drawing, and merely by manipulation of the needle valve 21, it is possible to vary the outlet orifice *area* $S_4$ and thereby vary the effective pressure $P_3$ in chamber 13. It is also apparent that the scale 23, which is scanned by the pointer 22, can be readily calibrated so as to indicate different values of $P_1/P_2$. Merely by moving the needle valve 21 so as to locate the pointer opposite the desired value of $P_1/P_2$ on the calibrated scale, the actual pressure $P_1$ is multiplied by a factor to provide a different effective pressure $P_3$ and thus to maintain a different value of $P_1/P_2$. Applications of this device will be readily apparent. Thus the needle valve 21 may be operated manually, and when set at a given value of $P_1/P_2$, the apparatus will function automatically to control the valve 31 so as to increase or decrease flow of fuel to an engine, so as to maintain the desired pressure ratio. Alternatively, the needle valve 21 may be actuated automatically by a force exerted directly or indirectly by the system under control.

A practical application of the device and method of this invention is described in my co-pending application Serial No. 53,791, filed October 11, 1948, *now Patent 2,641,105 dated June 9, 1953*, entitled "Temperature Control System," to which reference may be had for complete details. In the said application there is described a system for controlling the turbine inlet temperature of a turbojet engine, in which the fuel line is provided with a valve actuated by a flexible diaphragm as described above and as shown in the drawing. In such system it is desired to exert a force on one side of the diaphragm which is proportional to a temperature and to a pressure prevailing in the engine. This is accomplished by admitting the gas to one side of the diaphragm through a choked duct and venting it through a choked duct similar to the choked ducts 19 and 20 described above. The outlet duct is controlled by a needle valve whose travel is determined by a thermal expansive diaphragm which is subjected to the process temperature under consideration.

Many other applications of the pressure control device herein described will be apparent to one skilled in the art, and it will also be apparent that either the inlet or the outlet orifice may be controlled, as desired, and that the net force on the diaphragm may be used to operate a valve in a fuel line or for any other purpose.

It is thus apparent that a pressure control device and a pressure control method are provided which are operable to control a pressure, or to control the ratio between two pressures, and to vary such ratio as desired automatically and without any mechanical change in the system other than movement of a simple valve.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A pressure control device comprising a chamber, a pressure responsive member disposed therein presenting opposite sides of areas $S_1$ and $S_2$, means for introducing gas to one side of area $S_1$, means *separate from said first mentioned means and not in communication therewith* for introducing gas to the other side of area $S_2$, and means for varying the effective gas pressure exerted on area $S_1$, said [means comprising] *first mentioned means provided with* an inlet duct having a convergent-divergent section, an outlet duct having a convergent-divergent section, *a gas source for supplying the gas to said inlet duct at a pressure sufficient to cause sonic velocity flow at the throat of both sections,* and a valve operable to vary the throat area of one of said sections.

2. A pressure control device comprising a chamber, a diaphragm disposed therein, a duct for admitting gas to one side of said diaphragm, and a gas inlet and a gas outlet *each separate from said duct and not in communication therewith* for admitting a gas to the opposite side of said diaphragm and venting the gas therefrom, said inlet and outlet being each provided with a convergent-divergent section, *a gas source for introducing the gas to said gas inlet at a pressure sufficient to cause sonic velocity flow at the throat of each said sections,* and a valve for one of said sections operable to vary the throat area thereof.

3. A pressure control device comprising a chamber, a diaphragm disposed therein, a duct for admitting gas to one side of said diaphragm, and [a] *another* gas inlet and a gas outlet *each separate from said duct and not in communication therewith* for admitting a gas to the opposite side of said diaphragm and venting the gas therefrom, said inlet and outlet being each provided with a convergent-divergent section, *means for supplying the gas at said inlet at a pressure sufficient to cause sonic velocity flow at the throats of said sections,* and a valve for said outlet operable to vary the throat area of the convergent-divergent section thereof.

4. A pressure control device comprising a chamber, a diaphragm disposed therein, a bellows disposed on one side of and secured to said diaphragm, said bellows defining a central area and an annular evacuated area, a duct for admitting a gas to the opposite side of said diaphragm, inlet and outlet ducts for said bellows *to admit and vent another gas from said central area,* a convergent-divergent section disposed in each of said inlet ond outlet ducts, *the pressure of the gas introduced to said inlet duct being sufficient to cause sonic velocity flow at the throat of each of said sections,* and a valve operable to vary the throat area of one of said sections.

5. A control device comprising a chamber, a pressure-responsive diaphragm mounted within said chamber, means for supplying *a compressible* fluid under pressure to each side of said diaphragm, means for limiting the effective area of one side of said diaphragm, said means including a flexible partition dividing the space of one side of the *diaphragm* [bellows] into a plurality of sub-chambers, the means for supplying fluid under pressure to one of said sub-chambers comprising a choked inlet and a choked outlet, *the pressure of the fluid introduced to said choked inlet being sufficient to sauce sonic flow at the throat of both said choked inlet and said choked outlet,* and valve means for varying the area of the choked outlet.

6. A pressure control device comprising a chamber, a pressure-responsive diaphragm mounted in said chamber and dividing said chamber into a pair of sub-chambers, means for supplying fluid under pressure to one side of said diaphragm, means for limiting the effective pressure-responsive area of the other side of said diaphragm, said means including an annular bellows, means for admitting a compressible fluid under pressure to said bellows including a choked inlet and means for permitting egress of fluid from said bellows comprising a choked outlet, *the pressure of said admitted fluid being sufficient*

*to achieve sonic velocity flow at the throat of both said inlet and outlet,* and a valve for varying the effective area of said choked outlet, and valve means actuated by the movement of said bellows.

References Cited in the file of this patent or the original patent

UNITED STATES PATENTS

| | | |
|---|---|---|
| 647,758 | Orr | Apr. 17, 1900 |
| 787,136 | Warren | Apr. 11, 1905 |
| 1,112,641 | Moller | Oct. 6, 1914 |
| 1,178,222 | Earl | Apr. 4, 1916 |
| 1,363,513 | Keith | Dec. 28, 1920 |
| 1,522,907 | Price | Jan. 13, 1925 |
| 1,697,344 | Campbell | Jan. 1, 1929 |
| 1,893,200 | Dolbey | Jan. 3, 1933 |
| 2,051,307 | Lorraine | Aug. 18, 1936 |
| 2,069,917 | Fischer | Feb. 9, 1937 |
| 2,082,325 | Cross | June 1, 1937 |
| 2,313,797 | Bailey | Mar. 16, 1943 |
| 2,320,886 | Quiroz | June 1, 1943 |
| 2,356,970 | Brockett | Aug. 29, 1944 |
| 2,374,523 | Beecher | Apr. 24, 1945 |
| 2,431,200 | Rosenberger | Nov. 18, 1947 |
| 2,517,051 | Swenson | Aug. 1, 1950 |
| 2,549,623 | Moore | Apr. 17, 1951 |
| 2,570,624 | Wyckoff | Oct. 9, 1951 |